(12) United States Patent
Gray et al.

(10) Patent No.: US 7,475,672 B2
(45) Date of Patent: Jan. 13, 2009

(54) INDUCTIVE IGNITION CONTROL SYSTEM

(75) Inventors: Larry O. Gray, Aiken, SC (US); David W. Canestrari, Warrenville, SC (US); Bryant K. McLaughlin, Aiken, SC (US)

(73) Assignee: R.E. Phelon Company, Inc., Aiken, SC (US)

( * ) Notice: Subject to any disclaimer, the term of this patent is extended or adjusted under 35 U.S.C. 154(b) by 190 days.

(21) Appl. No.: 11/384,197

(22) Filed: Mar. 17, 2006

(65) Prior Publication Data

US 2006/0225702 A1 Oct. 12, 2006

Related U.S. Application Data

(60) Provisional application No. 60/663,004, filed on Mar. 18, 2005.

(51) Int. Cl.
*F02P 5/15* (2006.01)
(52) U.S. Cl. ............... 123/406.59; 123/609; 123/612; 123/616; 123/617; 123/652
(58) Field of Classification Search ............ 123/406.58, 123/406.59, 609, 612, 616, 617, 650, 652
See application file for complete search history.

(56) References Cited

U.S. PATENT DOCUMENTS

| | | | |
|---|---|---|---|
| 4,487,191 A | 12/1984 | Piteo | |
| 4,570,594 A | 2/1986 | Egami et al. | |
| 4,627,399 A | 12/1986 | Yoshida et al. | |
| 4,791,569 A | 12/1988 | Suzuki | |
| 4,870,587 A * | 9/1989 | Kumagai | 701/110 |
| 5,184,590 A | 2/1993 | Hashimoto et al. | |
| 5,823,166 A * | 10/1998 | Entenmann et al. | 123/406.58 |
| 6,012,427 A * | 1/2000 | Hoy et al. | 123/406.5 |
| 6,032,649 A * | 3/2000 | Ono | 123/406.58 |

(Continued)

FOREIGN PATENT DOCUMENTS

EP 0385793 A2 9/1990

(Continued)

OTHER PUBLICATIONS

H. Decker, A. Niegel: "Automotive Electric/Electronic System," Robert Bosch GMBH, Stuttgard, Germany, XP002384510, 1995, pp. 162-171.

(Continued)

*Primary Examiner*—Erick Solis
(74) *Attorney, Agent, or Firm*—Nelson Mullins Riley & Scarborough LLP

(57) ABSTRACT

An apparatus for producing an ignition spark in an internal combustion engine. The apparatus comprises an inductive ignition device having a primary coil and a secondary coil, flow of current through the primary coil being controlled by an electronic switching element (e.g., a transistor) responsive to a triggering signal. A rotatable body (e.g., the engine flywheel) having detectable features on a periphery thereof is also provided. A sensor device is located adjacent to the rotatable body at a fixed position and is operative to produce an output in response to the detectable features. The apparatus also includes a controller operative to receive an output from the sensor device and responsively produce the triggering signal so as to have a selected dwell time and ignition position.

9 Claims, 18 Drawing Sheets

U.S. PATENT DOCUMENTS 6,237,555 B1    5/2001   Dykstra et al.
6,752,134 B1 *  6/2004   Wilkinson ................ 123/609
6,805,110 B2 * 10/2004   Park .......................... 123/609
7,063,079 B2 *  6/2006   Huberts et al. ............. 123/630

FOREIGN PATENT DOCUMENTS

EP            0881383  A2   12/1998
EP            0893591  A2    1/1999

OTHER PUBLICATIONS

Partial European Search Report dated Jun. 28, 2006, issued by European Patent Office for corresponding EPO application filed Mar. 20, 2006.

Extended European Search Report dated Oct. 20, 2006, issued by European Patent Office for corresponding EPO application filed Mar. 20, 2006.

*Patent Abstracts of Japan*, vol. 011, No. 210 (M-604), Jul. 8, 1987, Abstract of JP 62026375.

* cited by examiner

TOOTH INTERRUPT SERVICE, CONT.

INDUCTIVE IGNITION CONTROL SYSTEM

PRIORITY CLAIM

This application is based upon and claims the benefit of provisional application Ser. No. 60/663,004, filed Mar. 18, 2005, which is relied upon and incorporated herein by reference.

BACKGROUND OF THE INVENTION

The present invention relates to ignition systems for internal combustion engines. More specifically, the invention relates to an ignition system of the inductive type having certain novel features.

Inductive ignition systems are well-known in the art. Conventionally, such systems use a primary coil and a secondary or ignition coil. The primary coil is connected such that a current can flow through it. At a predetermined point in the piston's stroke, a transistor in series with the primary coil circuit opens. As a result, the current through the primary coil quickly goes to zero.

This rapid change in current through the primary coil induces a voltage across the secondary coil sufficient to arc across a spark plug gap on a spark plug attached to the secondary coil circuit. The number of windings in the primary and secondary coils is such that the voltage induced in the secondary coil is high enough to arc across the spark plug gap.

An example of a conventional inductive ignition system is disclosed in U.S. Pat. No. 4,487,191, the disclosure of which is incorporated herein by reference.

While conventional inductive ignition systems have been successful at firing a spark plug at approximately the same time during successive rotations of a piston-cylinder engine, there is a need for more precise control over the exact time of firing and the duration/intensity of the spark. Such a new ignition system would have the further benefit of reducing emissions and reducing wear on the engine due to combustion at a non-ideal time in the engine cycle.

SUMMARY OF THE INVENTION

The present invention recognizes the foregoing and other disadvantages of prior art systems and methods.

In accordance with one aspect, the present invention provides an apparatus for producing an ignition spark in an internal combustion engine. The apparatus comprises an inductive ignition device having a primary coil and a secondary coil, flow of current through the primary coil being controlled by an electronic switching element (e.g., a transistor) responsive to a triggering signal. A rotatable body (e.g., the engine flywheel) having detectable features on a periphery thereof is also provided. A sensor device is located adjacent to the rotatable body at a fixed position and is operative to produce an output in response to the detectable features. The apparatus also includes a controller operative to receive an output from the sensor device and responsively produce the triggering signal so as to have a selected dwell time and ignition position.

In some exemplary embodiments, the detectable features comprise a plurality of projections located on the periphery of the rotatable body. In this regard, the projections are preferably located at a plurality of index positions evenly spaced such that one of the index positions is without a corresponding projection. For example, the projections may be teeth situated on the periphery of the rotatable body.

It will often be desirable for the controller to synchronize against the detectable features in order to chronologically locate the ignition position. Preferably, the controller may be further operative to ascertain engine speed and mechanical position by sensing the detectable features and then determine the dwell time and ignition position based thereon. The controller may chronologically locate the ignition position by predicting engine position between two of the detectable features.

In many preferred embodiments, the dwell time is determined at least in part based on average engine speed. The controller may also sample battery voltage as a factor in determination of the dwell time. If the internal combustion engine is a four stroke engine, the controller may be operative not to produce a triggering signal during the power/exhaust stroke thereof.

Other aspects of the present invention are provided by a method for determining time at which an ignition spark will be produced in an internal combustion engine. One step of the method involves providing a rotatable body that turns in synchronism with operation of the engine, the rotatable body having detectable features on a periphery thereof. According to a further step, the detectable features on the rotatable body are sensed so as to ascertain a mechanical position of the engine. A triggering signal is produced so as to yield the ignition spark at a selected ignition position. For example, the ignition spark may be produced on a trailing edge of the triggering signal. In addition, a dwell time of the triggering signal may be varied.

Additional aspects of the present invention are provided by an apparatus for producing an ignition spark in an internal combustion engine. The apparatus comprises an inductive ignition device having a primary coil and a secondary coil, flow of current through the primary coil being controlled by an electronic switching element responsive to a triggering signal. A sensor device is operative to produce an output indicative of engine speed and mechanical position. The apparatus further includes a controller operative to receive an output from the sensor device. The controller produces the triggering signal so as to have variable dwell time and ignition position based on the engine speed and mechanical position.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
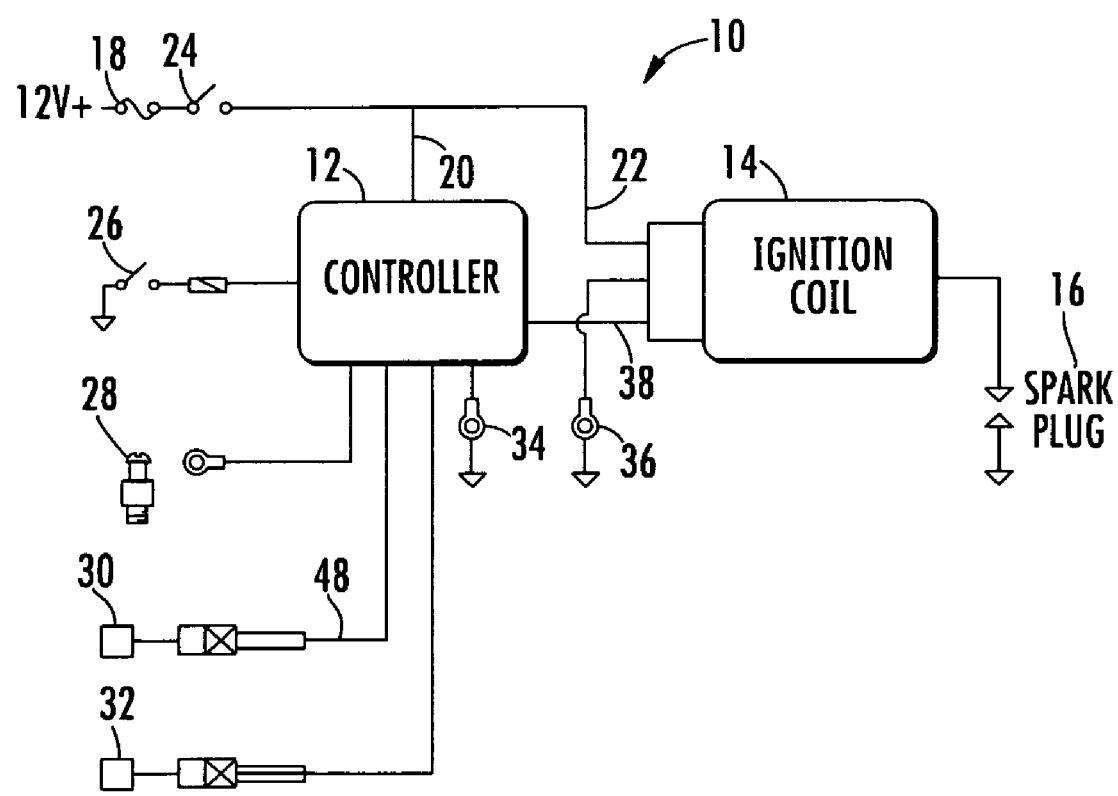
FIG. 1 is a block diagram of an inductive ignition system constructed in accordance with the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

In accordance with one preferred embodiment, an ignition system of the present invention may be used on a single cylinder engine such as are often utilized for small motorcycles. It should be appreciated, however, that principles of the present invention could be used with other types of internal combustion engines.

FIG. 1 illustrates a schematic diagram of an ignition system 10 in accordance with the present invention. Ignition system 10 includes controller 12, ignition coil 14, and spark plug 16. A 12VDC power source 18 is connected to both controller 12 and ignition coil 14 by wires 20 and 22, respectively. Ignition system 10 includes a conventional ignition switch 24. A second switch 26 optionally is provided in the illustrated embodiment. For example, switch 26 could be a side stand switch or seat pressure switch in a motorcycle application of the present invention.

A temperature sensor 28 is provided for sensing the temperature of the engine block. Preferably, the temperature sensor is a thermistor that outputs a linearly changing voltage as temperature changes. One skilled in the art will appreciate, however, that any other device for sensing temperature could also be used. The temperature of the engine block is used as an input to the control logic of the system; different timing curves may be used for warm-up and steady state operation of the engine.

Figure 3:
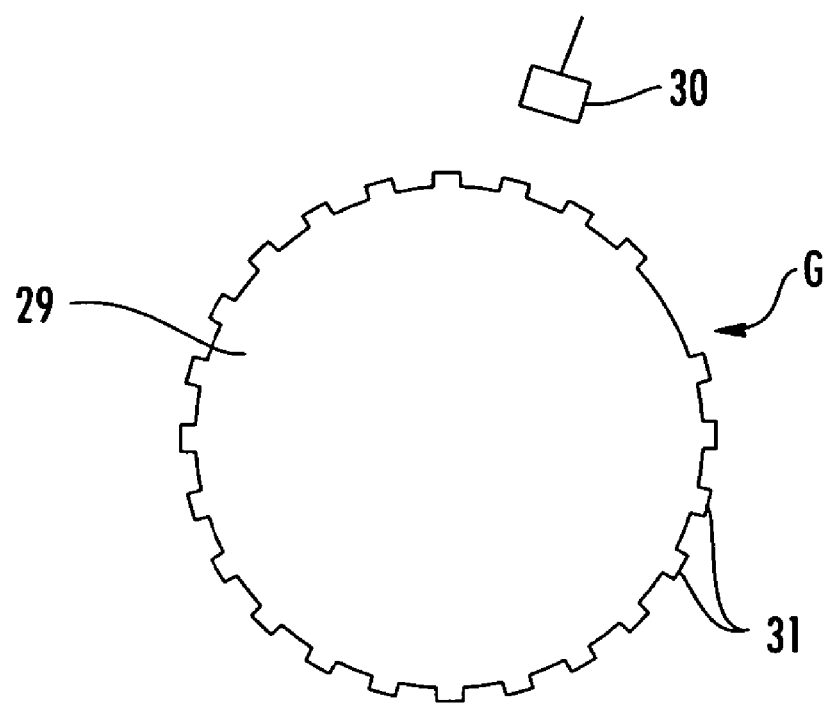
FIG. 3 diagrammatically shows a sensor adjacent to the engine flywheel so as to detect the mechanical position thereof.

An appropriate transducer 30 is provided to sense the mechanical position of the flywheel, and thus the piston, during operation. Referring now also to FIG. 3, transducer 30 (which is a variable reluctance transducer in this embodiment) is positioned adjacent the outer diameter of engine flywheel 29. Flywheel 29 has a series of teeth positions (e.g., twenty-four) (such as those indicated at 31) around its circumference. One of the positions (indicated at G) is missing a tooth, while the remaining positions have a metal tooth. Transducer 30 detects the presence or absence of the teeth as the flywheel turns. This position information is sent from transducer 30 to controller 12. In this embodiment, the teeth are positioned around the flywheel, but one skilled in the art will appreciate they could also be on the crankshaft or another location that provides a mechanical indication of engine position.

Referring again to FIG. 1, a throttle position sensor 32 also communicates with controller 12. The throttle position sensor could be a linear variable displacement transducer, a potentiometer (as in the preferred embodiment), or any other suitable sensor. The throttle position determines the load request from the operator. The timing curve utilized by controller 12 may be changed depending on the load request.

Figure 4:
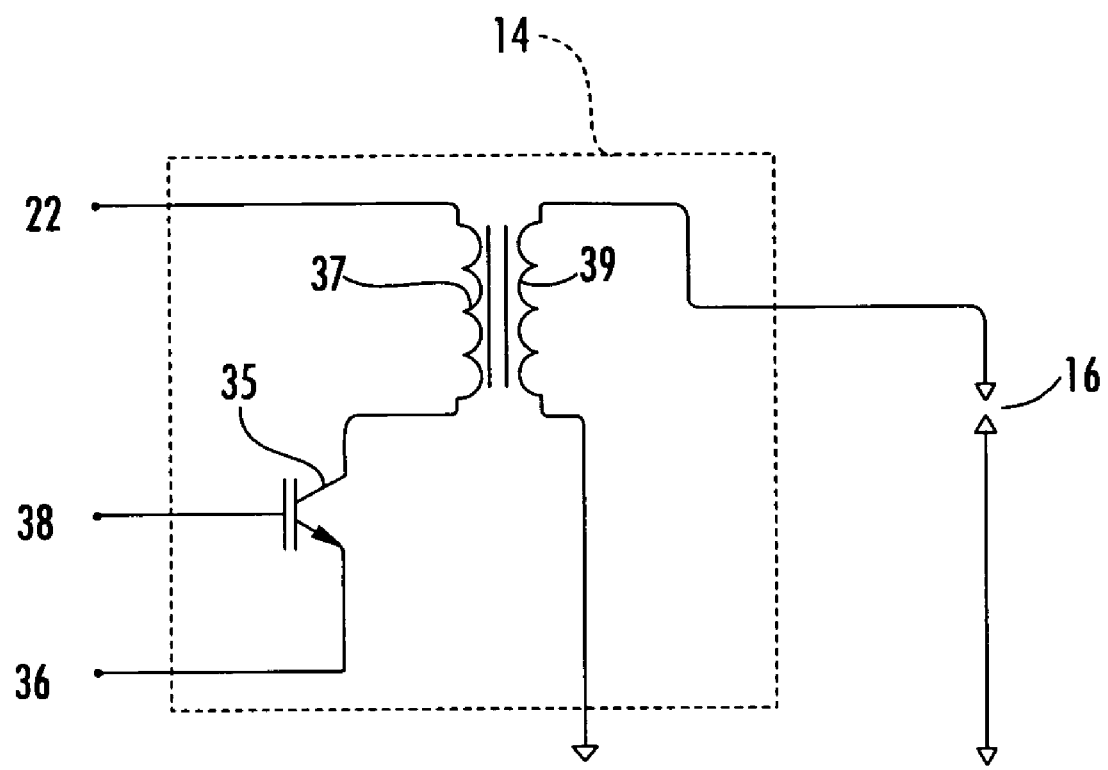
FIG. 4 is a schematic representation of a typical ignition coil circuit that may be used with the present invention.
Figure 6:
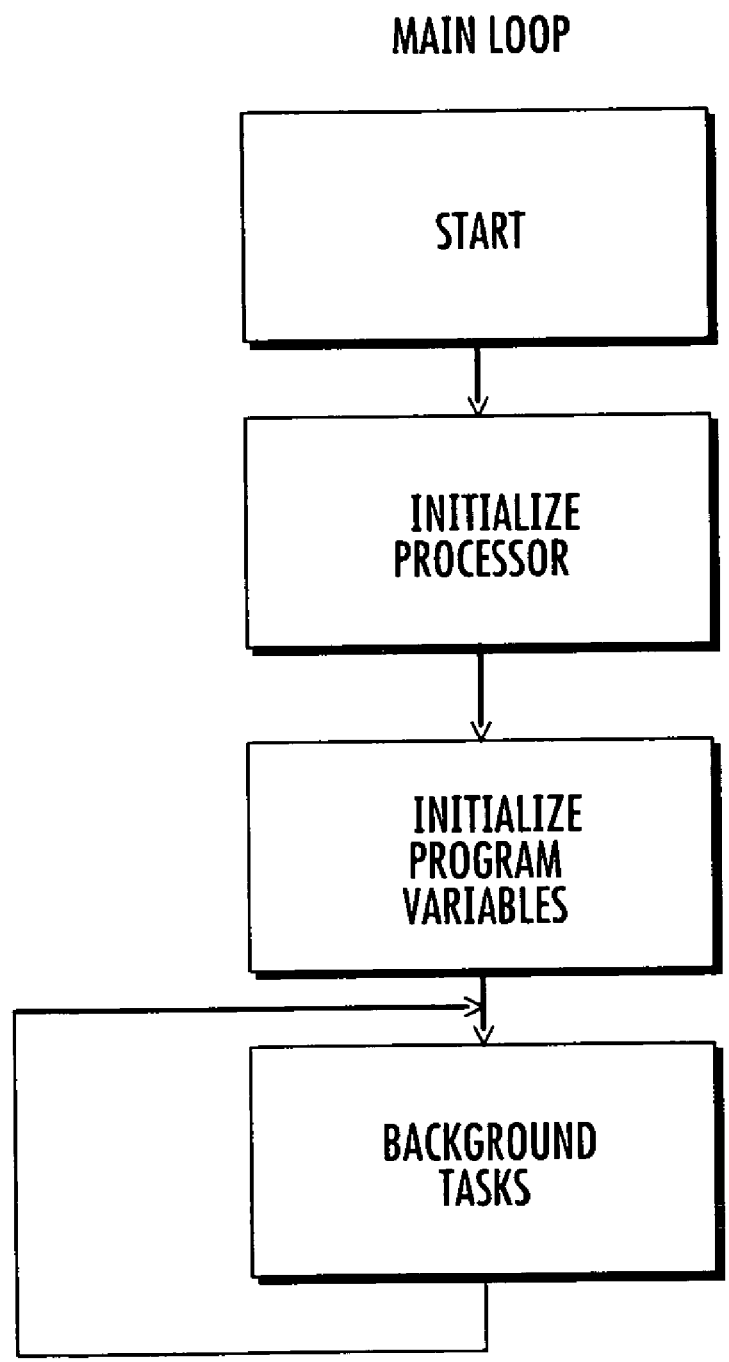
FIGS. 6 through 15 are flowcharts describing various processes executed by a microprocessor for use with an ignition system of the present invention.
Figure 7A:
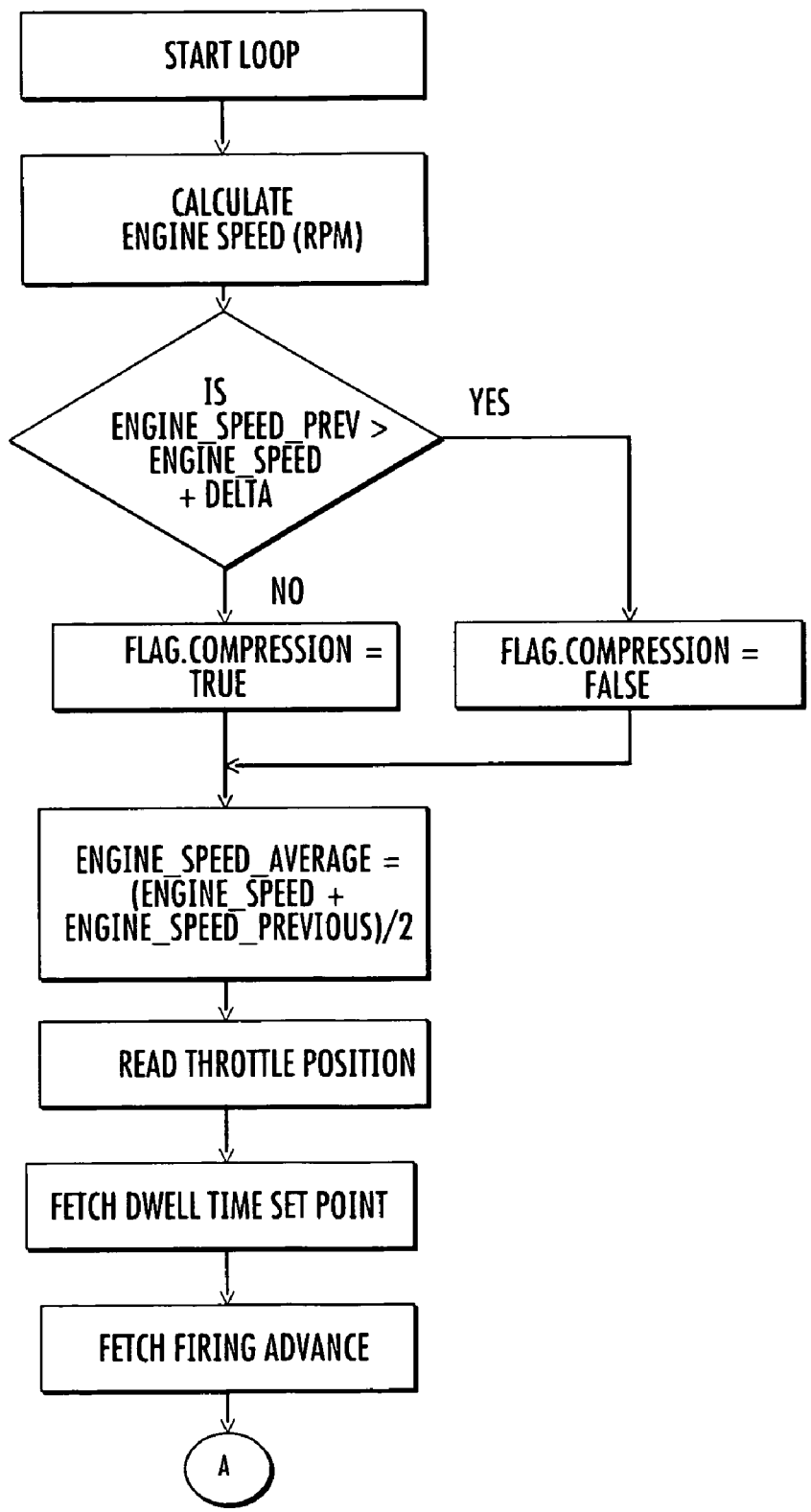
Figure 7B:
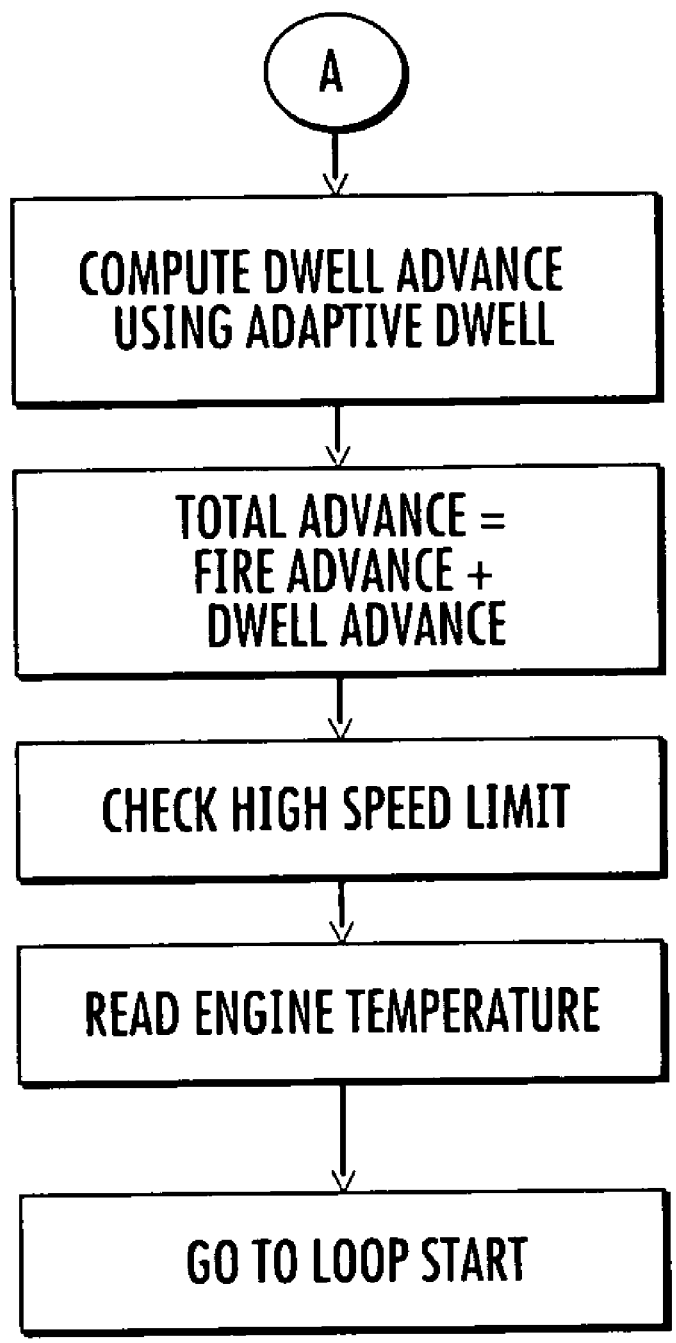
Figure 8A:
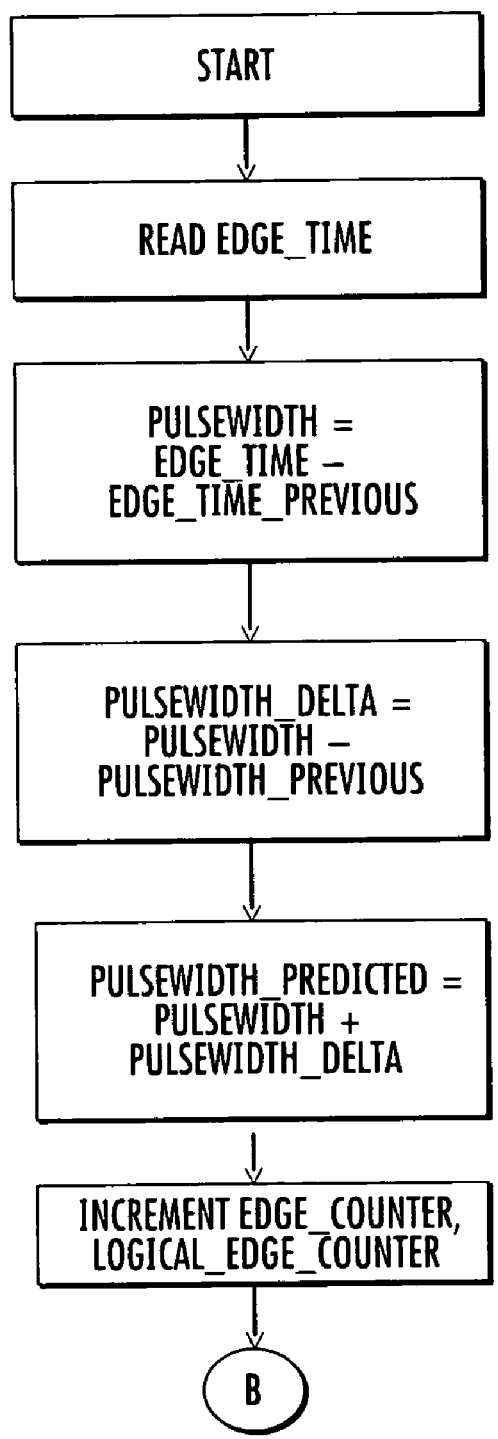
Figure 8B:
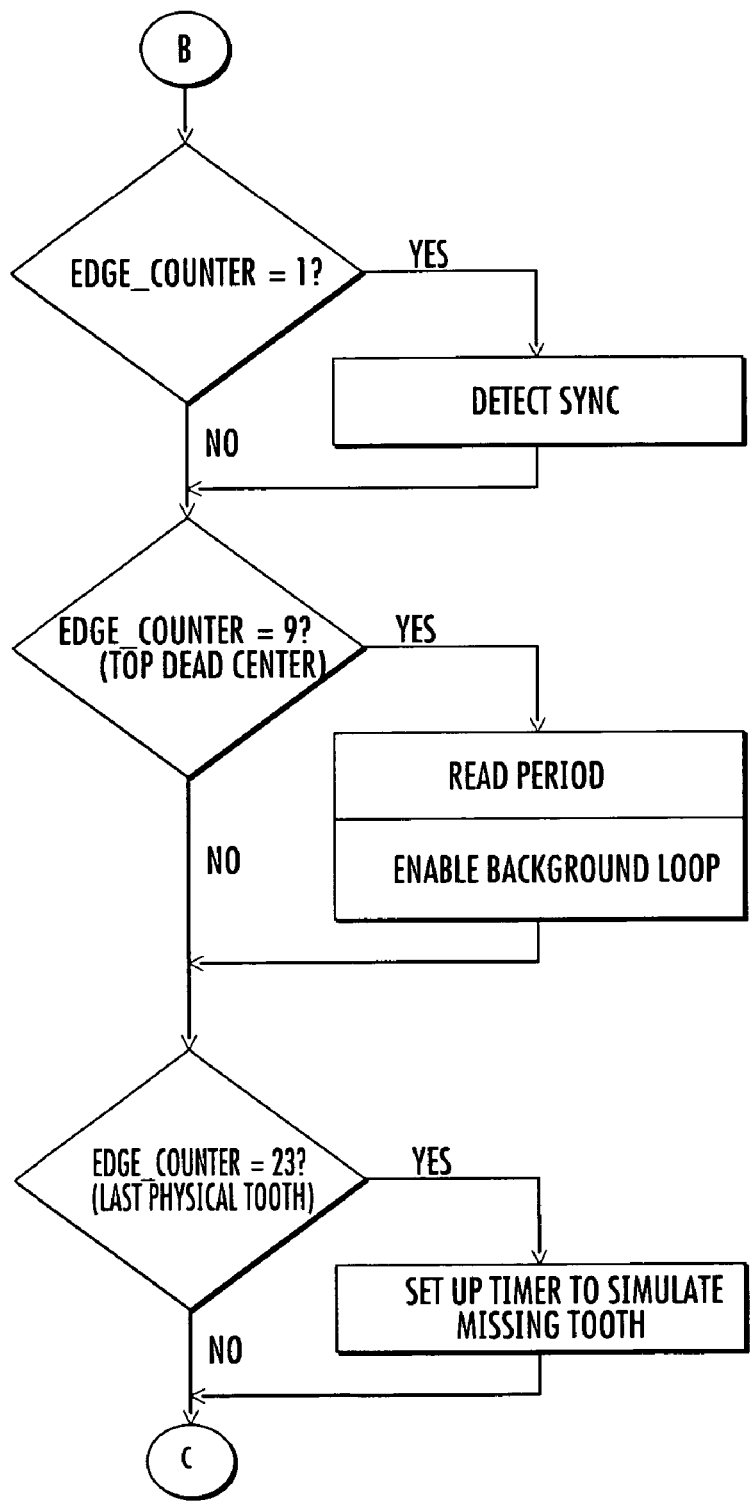
Figure 8C:
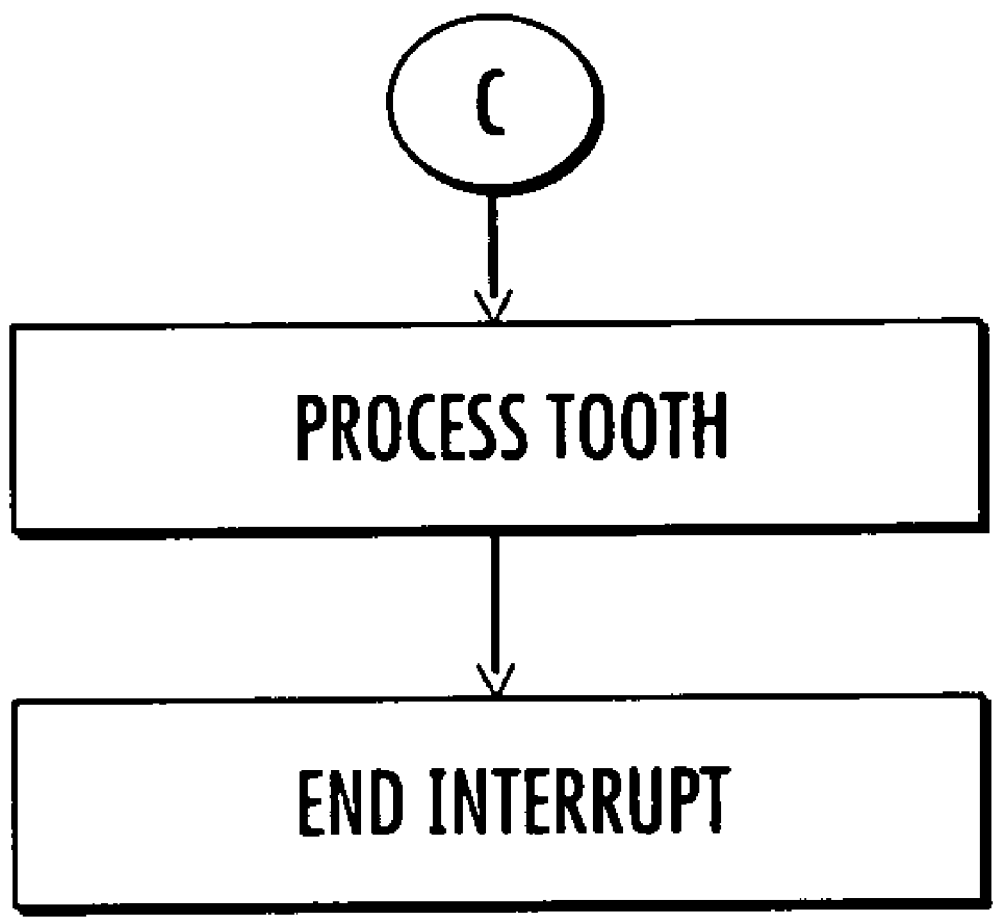
Figure 9:
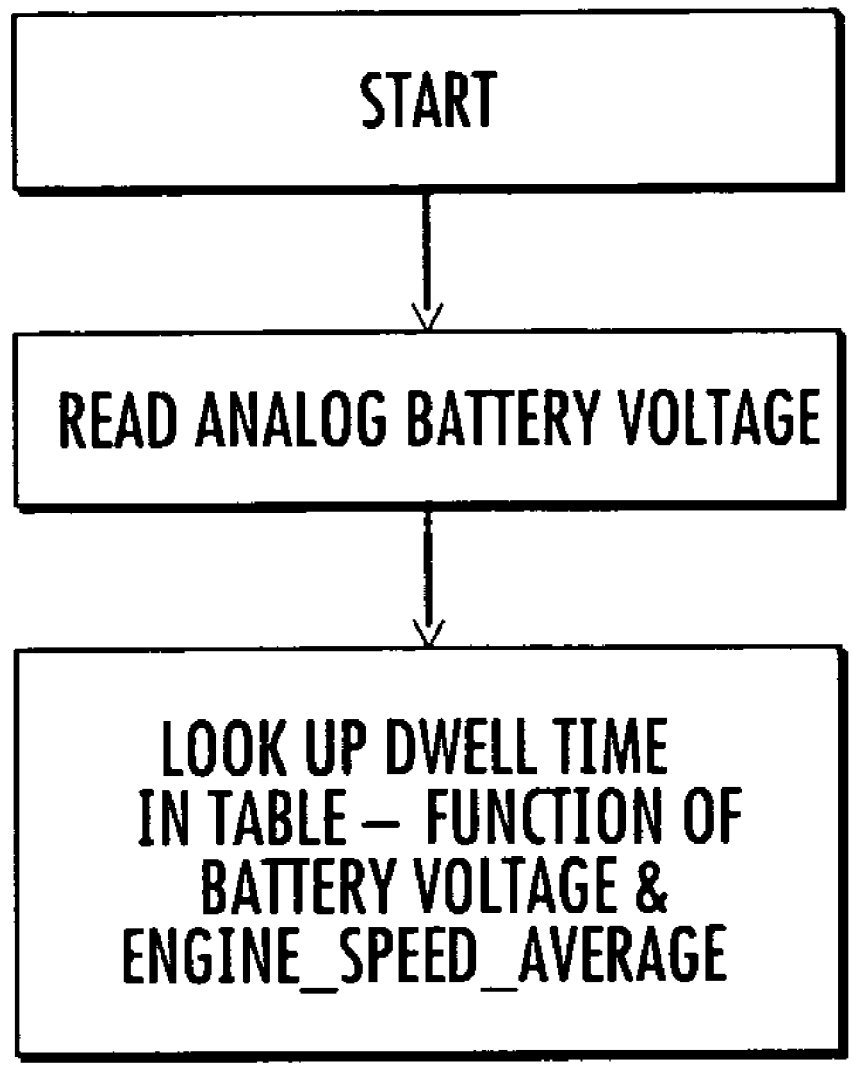
Figure 10:
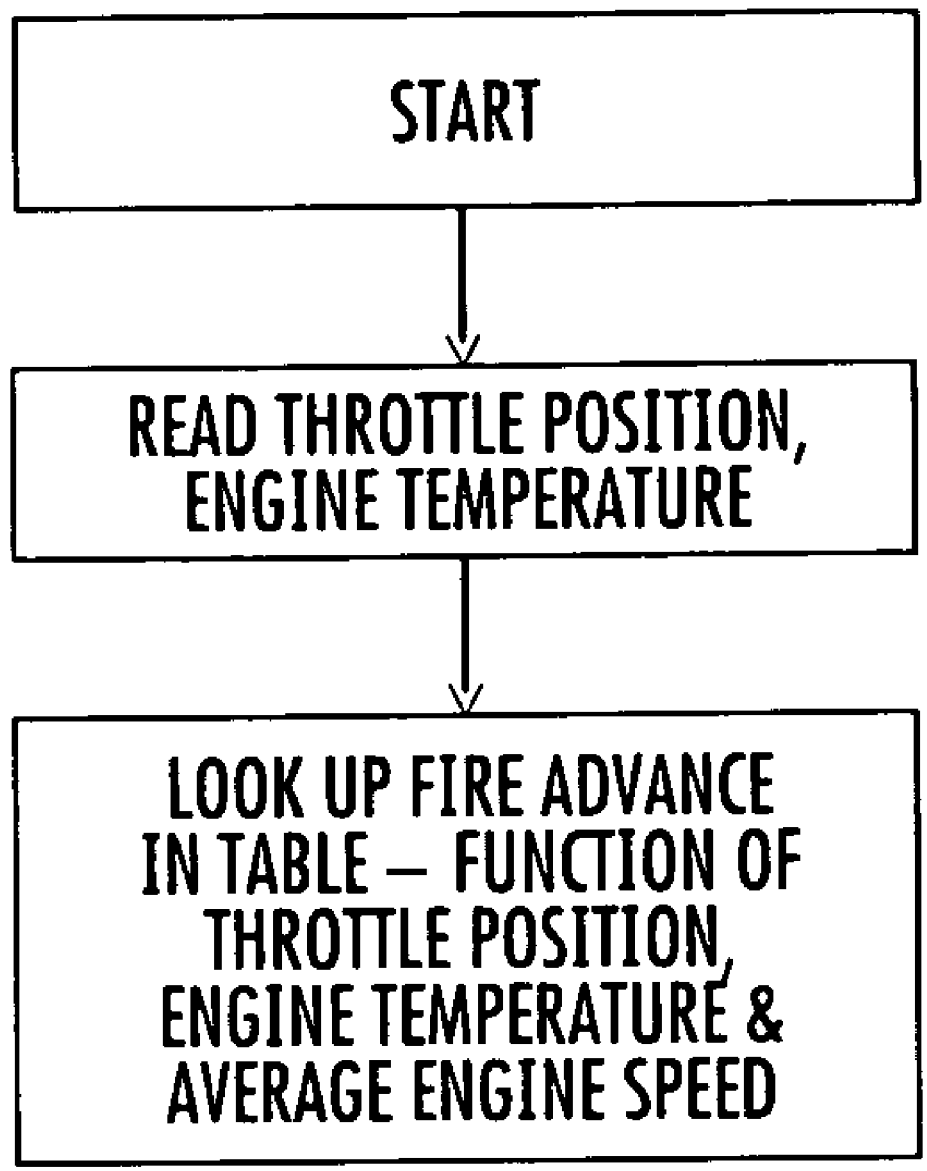
Figure 11A:
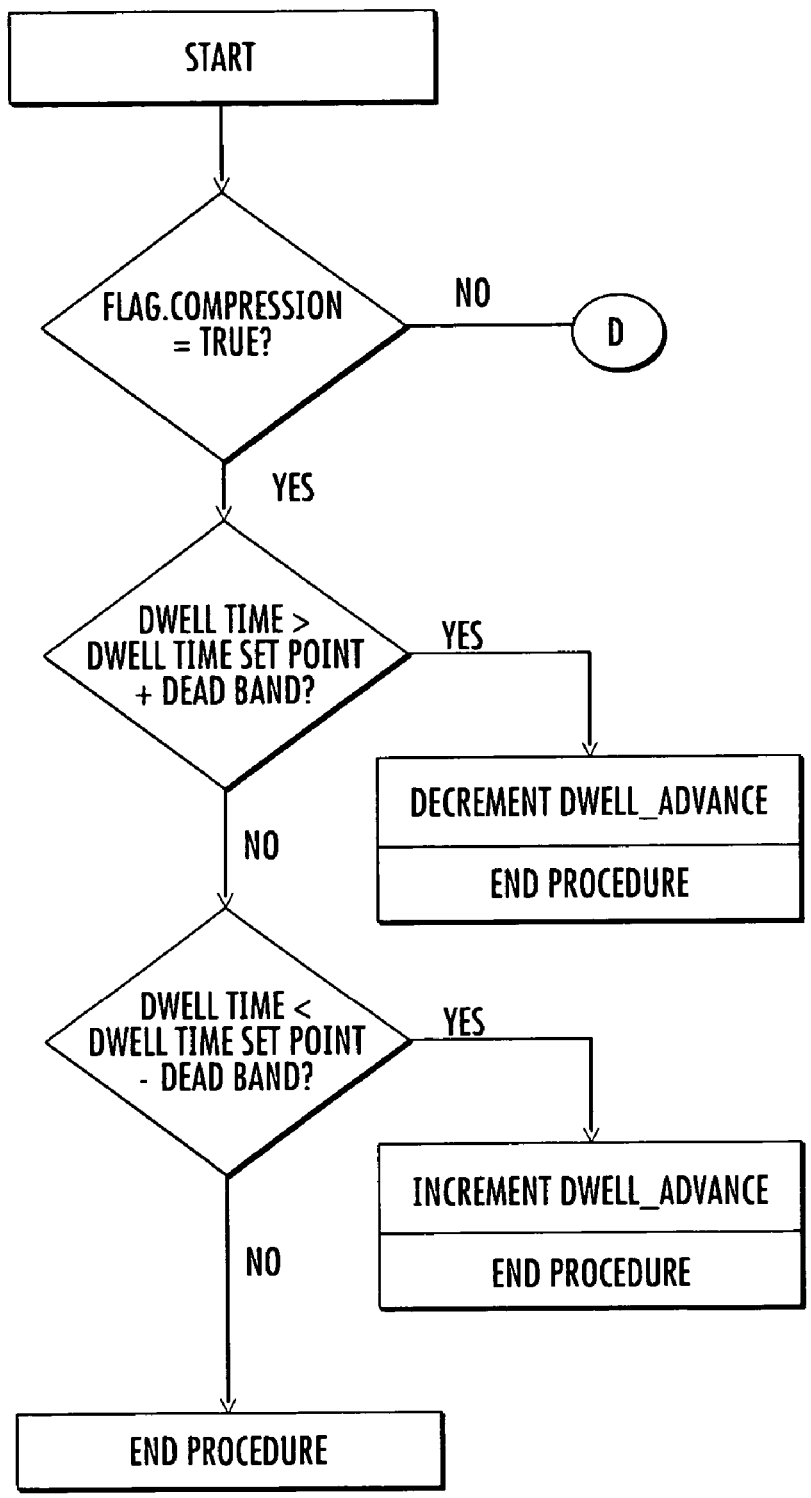
Figure 11B:
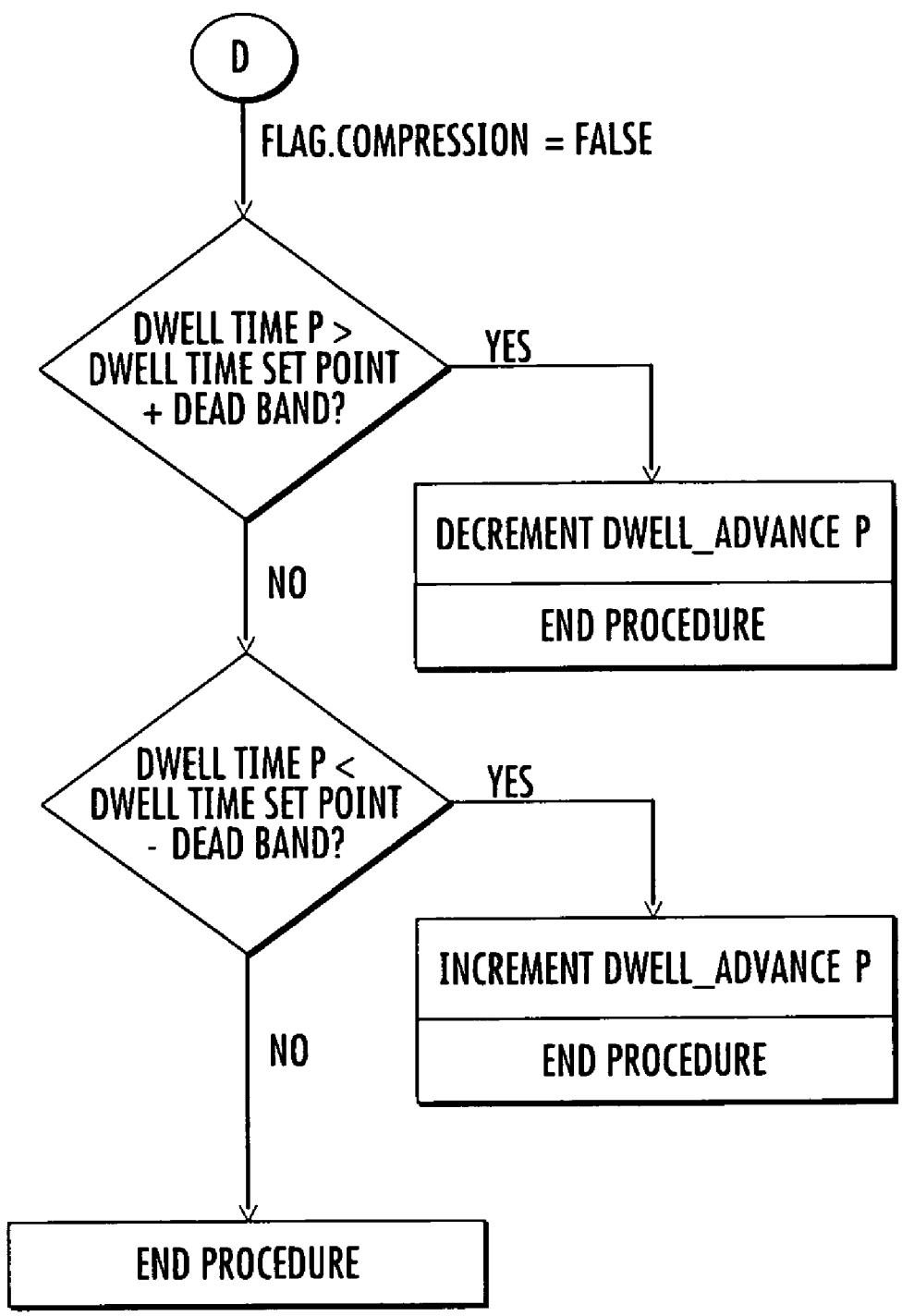
Figure 12:
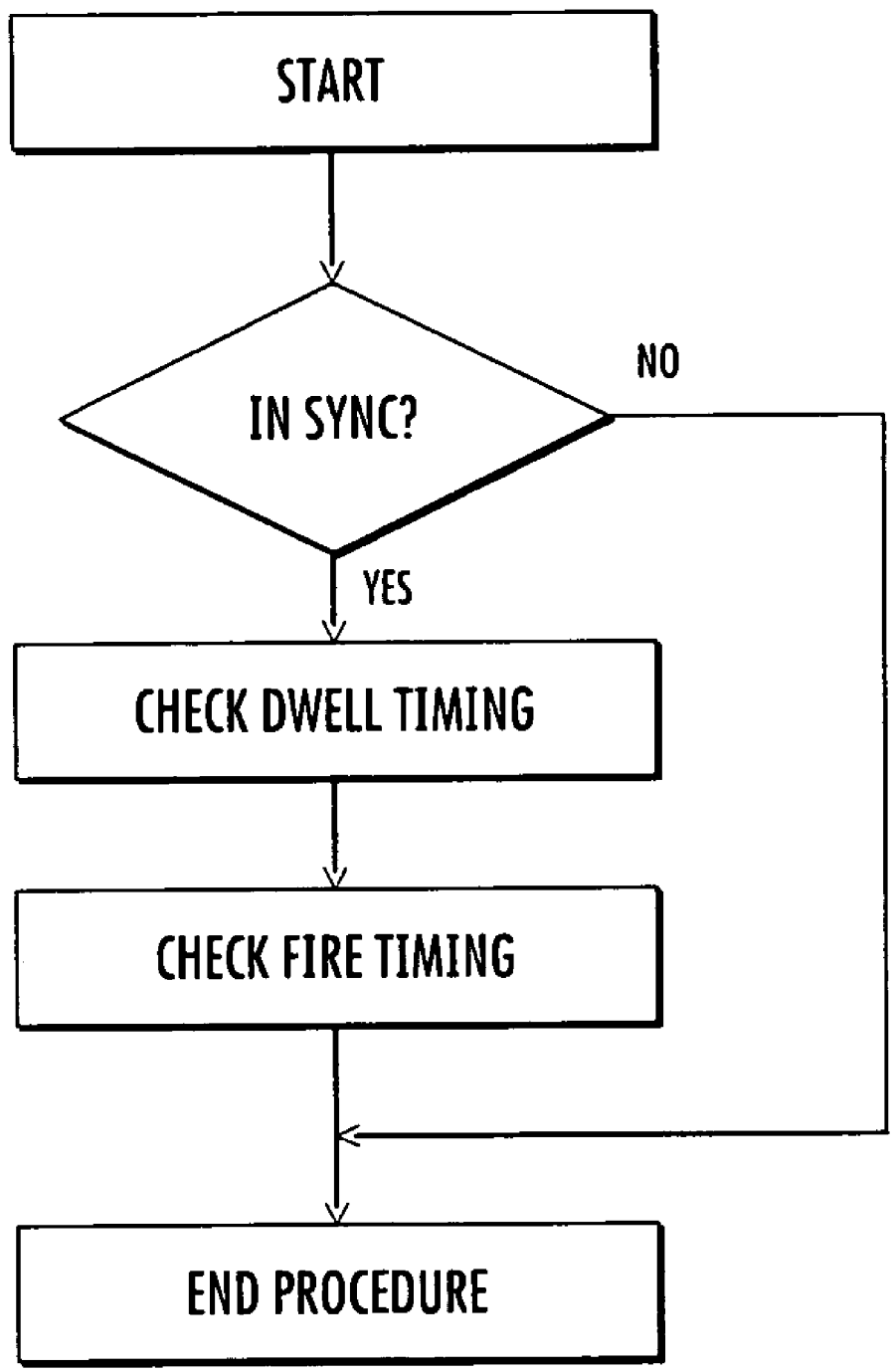
Figure 13:
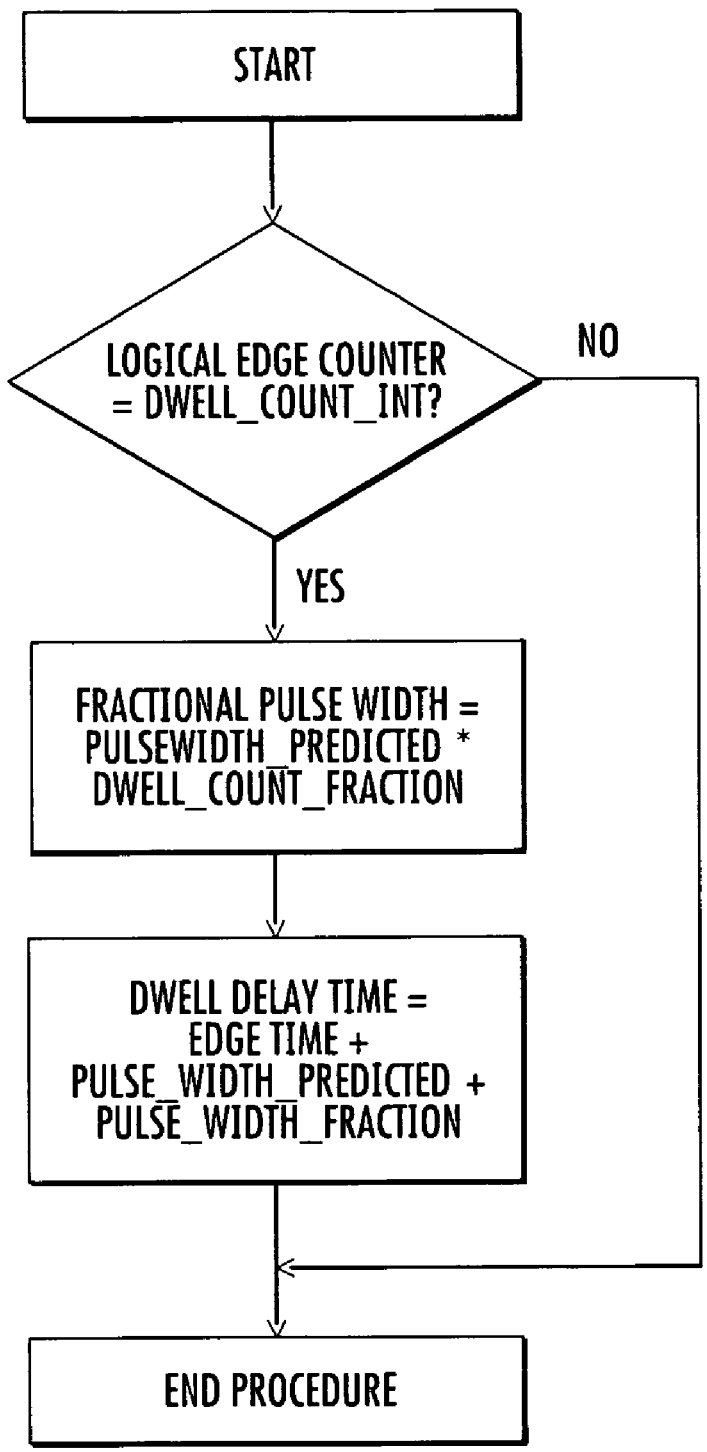
Figure 14:
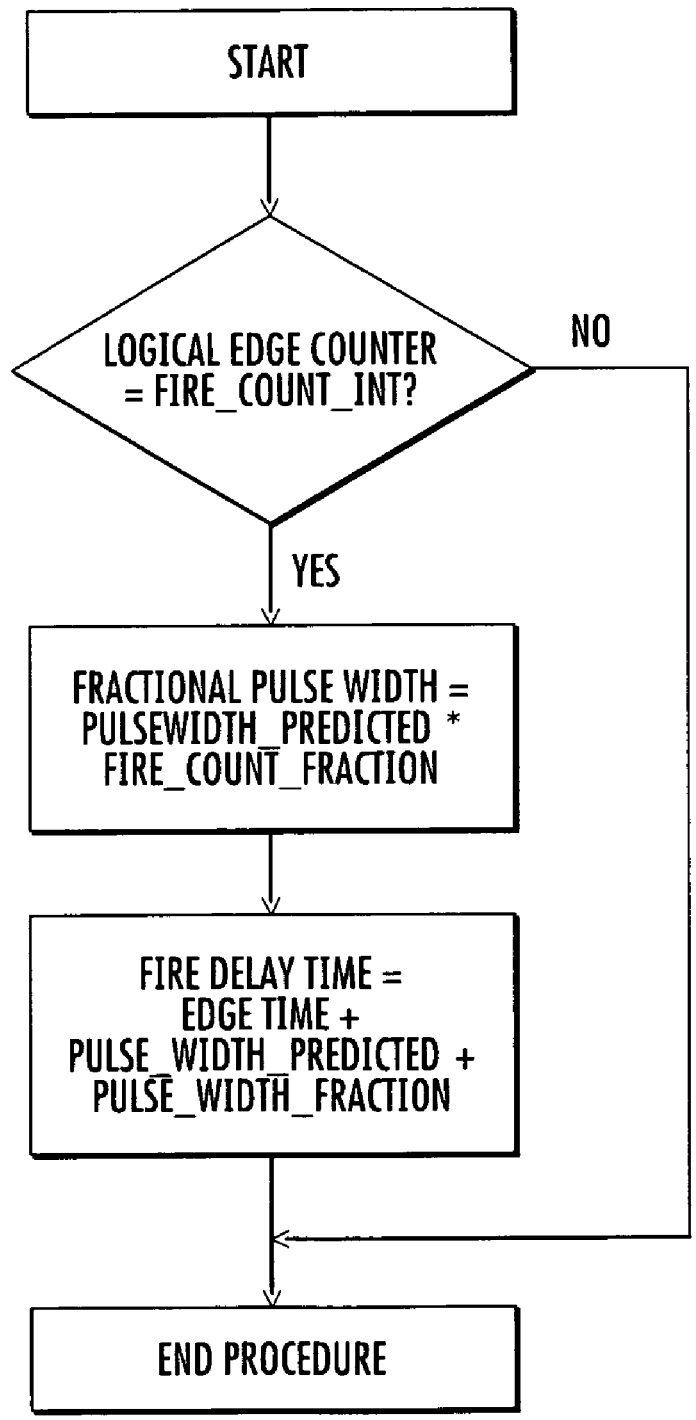
Figure 15:
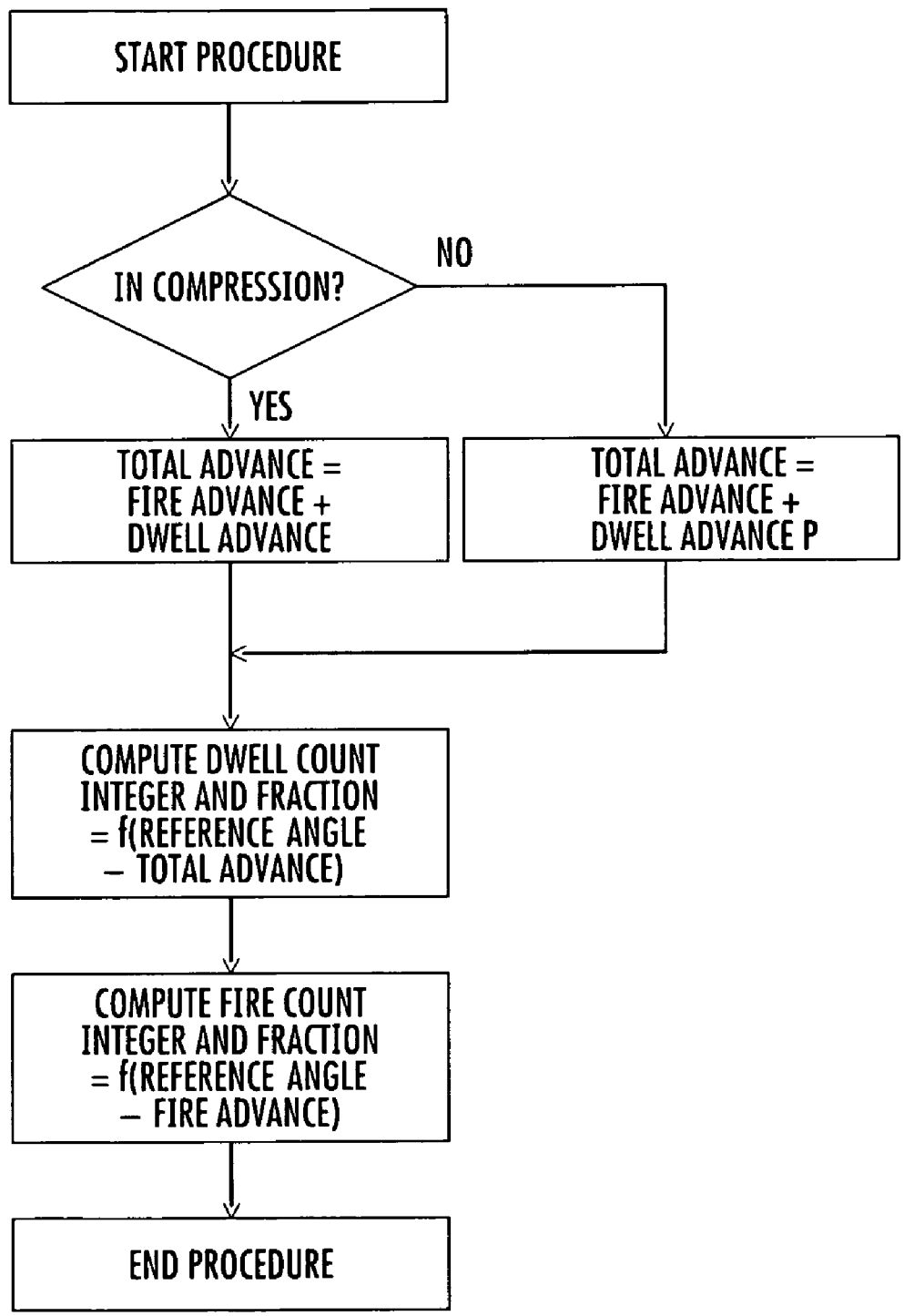

Ground lugs 34 and 36 are provided to connect the controller and ignition coil to vehicle ground. An ignition coil input wire 38 runs from controller 12 to ignition coil 14. As shown in FIG. 4, wire 38 carries a signal to an insulated gate bipolar transistor (IGBT) 35 within the ignition coil 14 and acts as a trigger input to that transistor. The operation of the primary and secondary coils (indicated at 37 and 39, respectively) within the ignition coil 14 is essentially the same as for traditional inductive ignition systems and should be understood by those of skill in the art.

Figure 2:
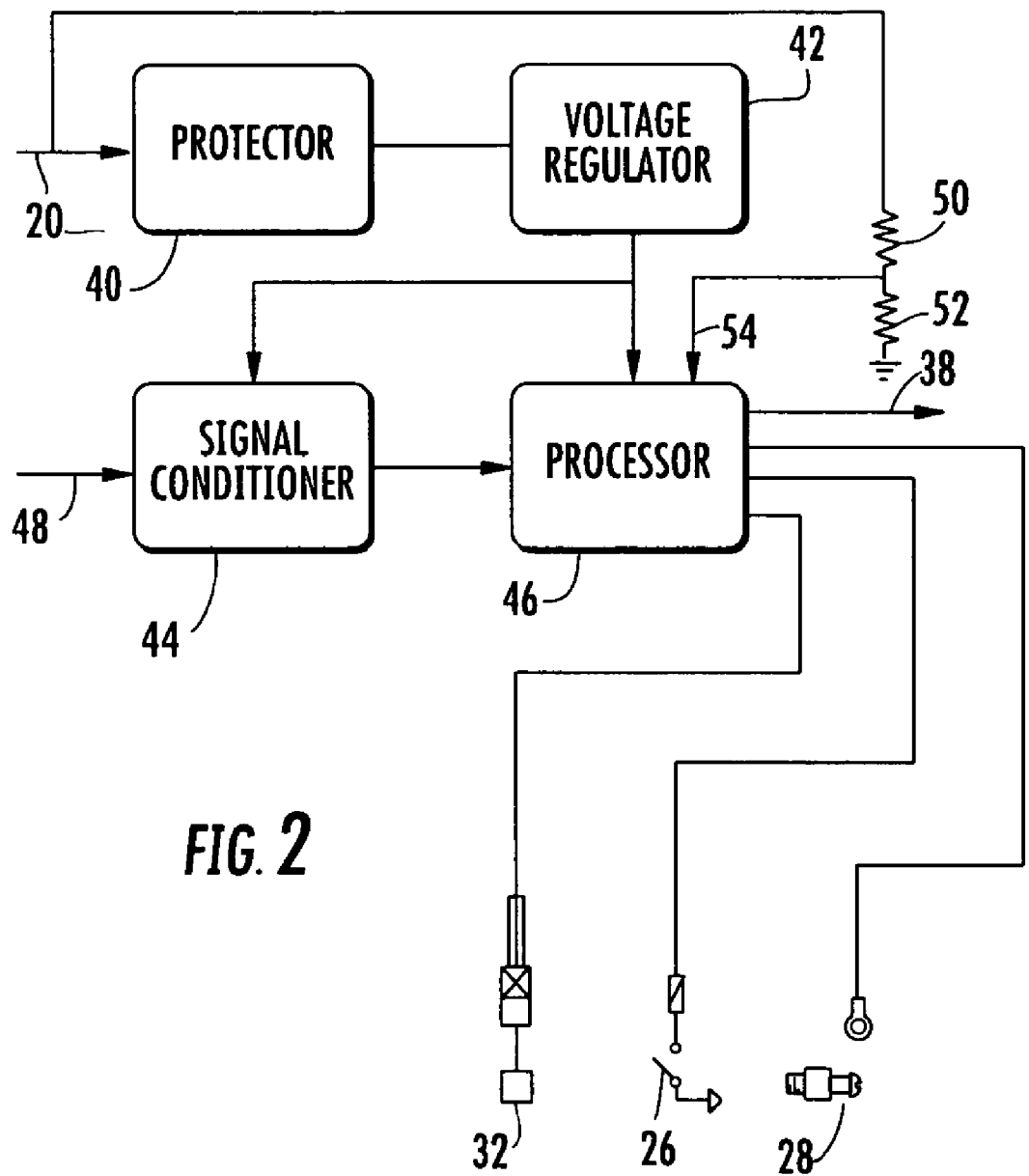
FIG. 2 is a block diagram of a controller for use with the ignition system of FIG. 1.

Referring now to FIG. 2, a preferred embodiment of controller 12 includes ground fault and transient protector 40, voltage regulator 42, input signal conditioner 44, and main processor 46. A signal from transducer 30 is provided to signal conditioner 44 at line 48. In this case, signal conditioner 44 conditions the signal from a variable sine curve into a block-shaped wave form for input into main processor 46. Ground fault and transient protector 40 and voltage regulator 42 protect the controller's electronics from voltage spikes in the system. Regulator 42 further provides a stable 5-volt signal to main processor 46 and signal conditioner 44.

In this embodiment, resistors 50 and 52 are configured and valued such that the voltage entering main processor 46 through wire 54 is one-third of the voltage at line 20. In this manner, processor 46 samples the battery voltage as one factor used in the timing calculations. Other inputs to the main processor include throttle position sensor 32, temperature sensor 28, and switch 26.

General Considerations

Figure 5:
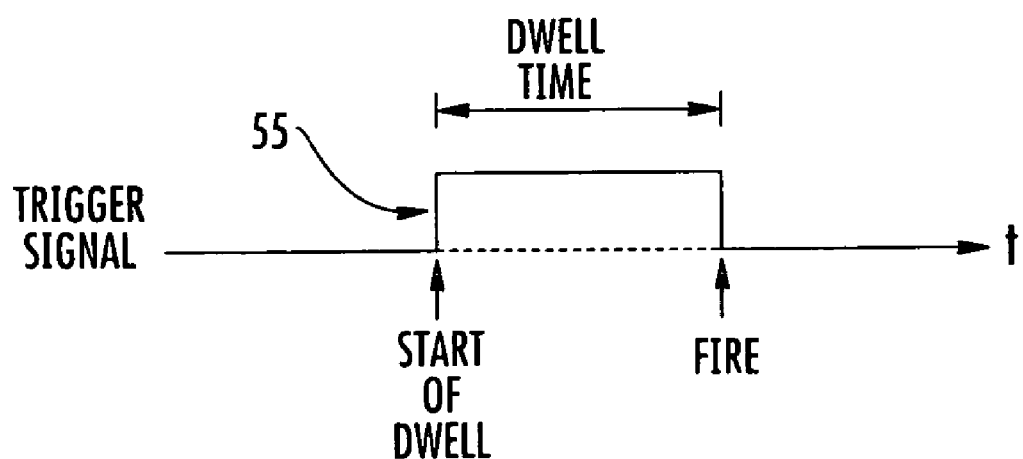
FIG. 5 illustrates a firing signal that may be generated in accordance with the present invention.

The controller uses a processor to provide a signal to ignition coil 14 to fire spark plug 16. Referring now to FIG. 5, this signal (indicated at 55) consists of a single digital pulse with prescribed starting and ending positions (relative to the engine crank position) and a duration (referred to as dwell time). The signal timing and position is determined by a number of factors, including engine speed, throttle position, engine temperature, and battery voltage.

In a preferred embodiment, the instantaneous engine speed of a single-cylinder four cycle motorcycle engine varies considerably within a firing cycle (due to the use of a light flywheel), perhaps up to a 1000-RPM variation. This variation in engine speed makes it very difficult to predict the position of an appropriate ignition pulse. As noted above, a series of gear teeth 31 are used around flywheel 29 to help closer specify the engine position for controller 12 (FIG. 3).

Controller 12, through the transducer 30, detects gear teeth 31, which in a preferred embodiment are spaced 15 degrees apart on the flywheel's periphery. (While the preferred embodiment uses 15 degrees, that can be modified, based on accuracy requirements by adding more or less gear teeth) For a 15 degree spacing, there should be 24 teeth around the wheel, but there is one tooth missing (as indicated at G in FIG. 3) for position synchronization. Typically, the first tooth after the missing tooth gap may be located at 120 degrees Before Top Dead Center (BTDC) in the flywheel's rotation.

Each gear tooth 31 is sensed as it passes by transducer 30, which ultimately produces a digital signal that is input to processor 46. The appropriate edge (either rising or falling) of the digital pulse is used as a timing and position reference for engine speed and rotation, based on the polarity of the sensor.

Since each tooth represents only 15 degrees of engine rotation and better accuracy is needed for the trigger signal (less than 1 degree), processor 46 uses both engine position and the time between pulses to correctly position the spark pulse. The controller accomplishes this by counting a prescribed number of tooth pulses (i.e. engine position) to get close to a firing position. Then, the controller switches to a time-based routine that interpolates the correct amount of time delay until firing.

Referring now also to the flowcharts of FIGS. 6-15, one methodology of achieving the desired ignition timing and duration will be described.

Background Routines

The background routines are a set of subroutines which are executed once per engine revolution. They are run after the Top Dead Center engine position is detected, since the spark plug has been fired before this occurs. This is also in a region before the next ignition pulse will be generated.

These subroutines read the throttle position, battery voltage, and engine temperature, computing the present engine speed in RPM, based on the most current period measurement (the time for one engine revolution). The average engine speed is also calculated, based on the current and the previous revolution's engine speed, since there can be variations between the intake/compression and the power/exhaust strokes of the engine cycles.

The desired dwell time is selected from an internal table, based on battery voltage and average engine speed. Also, the desired ignition advance is selected from an internal table, based on throttle position, engine temperature, and average engine speed. Ignition advance is the time between top dead center and the desired firing point. These values are used to compute the correct timing for the next engine cycle.

Also along with the background routines, an adaptive dwell routine is run to maintain the desired dwell time, and the power and intake/compression cycles of the engine are detected. Separate advance values are maintained for each type of engine cycle because of the wide variation in engine speed between the power and intake/compression strokes.

Tooth Interrupt Routine

The tooth interrupt routine is invoked whenever a pulse is presented at the External Input pin of processor 46. When this pin is driven to a logic high, the program that is running at that time is suspended, and the tooth interrupt routine is started. When this routine is finished, the interrupted program resumes from where it was stopped.

The interrupt routine records a time stamp (EDGETIME) at each tooth pulse event. It uses this information to compute the time for the most recent pulsewidth, the previous pulsewidth, and the time difference between these two pulsewidths. It also detects synchronization at startup and continues to check this on each revolution of the engine. If the controller loses synchronization for any reason, it resets and starts over.

In addition, the routine also maintains a counter which is used to track engine position at each tooth. Since each tooth represents 15 degrees of engine rotation, each count in the counter equals 15 degrees. Spark and dwell advance values are stored as 2-bytes, one representing an integer value in 15-degree "tooth" counts and the other representing a fractional value of a tooth. These integer and fractional values of dwell and spark advance are computed based on the desired advance relative to the actual tooth position on the flywheel. At each interrupt, a tooth counter is incremented and compared to the integer values of each type of advance. When the counter and the integer values are equal, a subroutine is run to either create the leading or trailing edge of the ignition pulse.

This subroutine (similar for the leading and trailing edges of the ignition pulse) uses the present EDGETIME as a reference time. It also uses the present pulsewidth time and the difference between that pulsewidth and the previous pulsewidth to predict a time in the future at which to create an edge. During the background loop, this computed time is compared to an internal real-time clock. When the times are equal, the appropriate edge is output to create the ignition pulse.

Adaptive Dwell Routine

It is desired to maintain a specified dwell time for each ignition pulse. During this dwell time, the current through the primary coil continues to rise. The dwell time is based on engine speed and battery voltage and defines the actual width of the ignition pulse. As the leading and trailing edges of the ignition pulse are generated, the actual dwell time is computed and is compared to the desired dwell time. If the actual and desired dwell times differ by greater than a small dead-band value, the dwell advance is adjusted by a small amount in the appropriate direction to bring the two dwell times to a value within the dead-band.

Power and Compression Cycles

In a four-cycle engine, a complete engine sequence consists of two engine revolutions. The first one consists of the intake and compression strokes; the second consists of the power and exhaust strokes. In normal operation, the engine will tend to slow down incrementally during the compression stroke, then speed up as the spark is generated and ignites the fuel/air mixture during the power stroke. As the processor is continually monitoring engine speed at each revolution, it can decide whether the engine is running in the compression or the power cycles and adjust the dwell and spark advance values accordingly. This is done because there can be a wide variation in the engine speed and hence instantaneous engine position between the two cycles. Differentiating between the compression and power cycles and adjusting spark and dwell advances independently increases the accuracy.

As the spark plug only needs to be fired during the intake/compression stroke, it is possible to eliminate the firing of the plug on the power/exhaust stroke (commonly called "waste spark") by detecting these engine cycles. Also, speed differences between adjacent engine cycles can be used to determine an engine "loading" value. This value can be used to adjust spark advance in relation to throttle position, engine speed, and other factors.

It can thus be seen that the present invention provides a novel timing control system for an inductive ignition. While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit of the following appended claims.

What is claimed is:

1. Apparatus for producing an ignition spark in an internal combustion engine, said apparatus comprising:
    an inductive ignition device having a primary coil and a secondary coil, flow of current through said primary coil being controlled by an electronic switching element responsive to a triggering signal;
    a rotatable body having detectable features on a periphery thereof;
    a sensor device located adjacent to said rotatable body at a fixed position, said sensor device being operative to produce an output in response to said detectable features; and
    a controller operative to receive an output from said sensor device and responsively produce said triggering signal, said triggering signal having a variable dwell time and ignition position, said controller being further operative to:
ascertain average engine speed and mechanical position by sensing said detectable features;
determine said dwell time and said ignition position based thereon; and
wherein said controller chronologically locates said ignition position by predicting engine position between two of said detectable features.

2. Apparatus as set forth in claim 1, wherein said detectable features comprise a plurality of projections located on said periphery of said rotatable body.

3. Apparatus as set forth in claim 2, wherein said projections are located at a plurality of index positions evenly spaced such that one of said index positions is without a corresponding projection.

4. Apparatus as set forth in claim 3, wherein said projections are teeth situated on said periphery of said rotatable body.

5. Apparatus as set forth in claim 2, wherein said rotatable body is an engine flywheel.

6. Apparatus as set forth in claim 1, wherein said electronic switching element is a transistor.

7. Apparatus as set forth in claim 1, wherein said dwell time is determined at least in part based on average engine speed.

8. Apparatus as set forth in claim 7, wherein said controller samples battery voltage as a factor in determination of said dwell time.

9. Apparatus as set forth in claim 1, wherein said internal combustion engine is a four stroke engine, said controller being operative not to produce a triggering signal during the power/exhaust stroke thereof.

* * * * *